United States Patent
Jagtiani et al.

(10) Patent No.: US 9,195,701 B2
(45) Date of Patent: Nov. 24, 2015

(54) SYSTEM AND METHOD FOR FLEXIBLE DISTRIBUTED MASSIVELY PARALLEL PROCESSING (MPP) DATABASE

(71) Applicant: FutureWei Technologies, Inc., Plano, TX (US)

(72) Inventors: Kamini Jagtiani, Sunnyvale, CA (US); Yang Sun, Palo Alto, CA (US); Siew Sim-Tang, Saratoga, CA (US); Gangavara Prasad Varakur, Danville, CA (US)

(73) Assignee: Futurewei Technologies, Inc., Plano, TX (US)

( * ) Notice: Subject to any disclaimer, the term of this patent is extended or adjusted under 35 U.S.C. 154(b) by 208 days.

(21) Appl. No.: 13/663,237

(22) Filed: Oct. 29, 2012

(65) Prior Publication Data

US 2014/0122484 A1    May 1, 2014

(51) Int. Cl.
*G06F 17/30*      (2006.01)

(52) U.S. Cl.
CPC ................ *G06F 17/30339* (2013.01)

(58) Field of Classification Search
CPC ............ G06F 17/30584; G06F 17/30339
USPC .......................................... 707/737
See application file for complete search history.

(56) References Cited

U.S. PATENT DOCUMENTS

| 7,203,686 | B1 * | 4/2007 | Sinclair et al. ................. 1/1 |
| 7,299,239 | B1 | 11/2007 | Basu et al. |
| 7,640,244 | B1 | 12/2009 | Morris et al. |
| 2005/0038784 | A1 * | 2/2005 | Zait et al. ..................... 707/5 |
| 2005/0187977 | A1 | 8/2005 | Frost |
| 2010/0030995 | A1 * | 2/2010 | Wang et al. ................. 711/173 |
| 2010/0281027 | A1 * | 11/2010 | Duan et al. .................. 707/737 |
| 2011/0179246 | A1 | 7/2011 | Kim |
| 2012/0109888 | A1 * | 5/2012 | Zhang et al. ................ 707/610 |
| 2012/0109892 | A1 * | 5/2012 | Novik et al. ................ 707/633 |
| 2012/0109926 | A1 * | 5/2012 | Novik et al. ................ 707/707 |

(Continued)

FOREIGN PATENT DOCUMENTS

| CN | 101639835 A | 2/2010 |
| CN | 101876983 A | 11/2010 |

(Continued)

OTHER PUBLICATIONS

International Search Report received in Application No. PCT/CN2013/086139, mailed Feb. 20, 2014, 11 pages.

(Continued)

*Primary Examiner* — Apu Mofiz
*Assistant Examiner* — Jared Bibbee
(74) *Attorney, Agent, or Firm* — Slater & Matsil, L.L.P.

(57) ABSTRACT

An embodiment method for massively parallel processing includes assigning a primary key to a first table in a database and a foreign key to a second table in the database, the foreign key of the second table identical to the primary key of the first table, determining a number of partition groups desired for the database, partitioning the first table into first partitions based on the primary key assigned and the number of partition groups desired, partitioning the second table into second partitions based on the foreign key assigned and the number of partition groups desired, and distributing the first partitions and the second partitions to the partition groups as partitioned. An embodiment system for implementing the embodiment methods is also disclosed.

17 Claims, 8 Drawing Sheets

(56) References Cited

U.S. PATENT DOCUMENTS

| | | | |
|---|---|---|---|
| 2012/0331335 A1* | 12/2012 | Judin et al. | 714/4.11 |
| 2013/0166606 A1* | 6/2013 | Fricke et al. | 707/803 |
| 2014/0067792 A1* | 3/2014 | Erdogan et al. | 707/718 |
| 2014/0122484 A1 | 5/2014 | Jagtiani et al. | |

FOREIGN PATENT DOCUMENTS

| | | | |
|---|---|---|---|
| CN | 101916261 A | 12/2010 | |
| CN | 102426602 A | 4/2012 | |
| CN | 102521234 A | 6/2012 | |
| WO | 03009178 A3 | 1/2003 | |

OTHER PUBLICATIONS

International Search Report and Written Opinion received in International Application No. PCT/CN2013/088276 mailed Mar. 6, 2014, 11 pages.

Extended European Search Report received in Application No. 13851963.2-1952, mailed Oct. 12, 2015, 8 pages.

Wikipedia, "Partition (Database)," https://en.wikipedia.org/w/index.php?title=Partition (database)&oldid=506792667, retrieved on Oct. 1, 2015, 2 pages.

* cited by examiner

SYSTEM AND METHOD FOR FLEXIBLE DISTRIBUTED MASSIVELY PARALLEL PROCESSING (MPP) DATABASE

TECHNICAL FIELD

The present disclosure relates to a massively parallel processing (MPP) database management system and, in particular embodiments, to a management system able to detach the number of database partitions from the number of fixed processors.

BACKGROUND

The concept of massively parallel processing (MPP) is the coordinated processing of a program by multiple processors, with each processer working on different parts of the program. The processors communicate with one another to complete a task with each of them using its own operating system and memory resources.

An MPP database system is based on shared-nothing architecture, with the tables of its databases partitioned into segments and distributed to different processing nodes. There is no data sharing among the processing nodes. When database queries arrive, the work of each query is divided and assigned to one of the processing nodes according to a data distribution plan and an optimized execution plan. The processing entities in each processing node manage only their portion of the data. However, these processing entities may communicate with one another to exchange necessary information during their work execution. A query may be divided into multiple sub-queries, and the sub-queries may be executed in parallel or in some optimal order in some or all the processing nodes. The results of the sub-queries may be aggregated and further processed, and subsequently more sub-queries may the executed according to the results.

One of the challenges in an MPP database system has always been in setting up the distributed system and distributing the data. How data is distributed and how much the distribution is aligned with the business logic greatly determines the overall performance of the system.

SUMMARY

An embodiment method for logically dividing a database into multiple independently operated smaller databases includes assigning a primary key to a first table in a database and a foreign key to a second table in the database, the foreign key of the second table identical to the primary key of the first table, determining a number of partition groups desired for the database, partitioning the first table into first partitions based on the primary key assigned and the number of partition groups desired, partitioning the second table into second partitions based on the foreign key assigned and the number of partition groups desired, and distributing the first partitions and the second partitions to the partition groups as partitioned.

An embodiment for logically dividing a database into multiple independently operated smaller databases includes determining a number of partition groups desired for a database, partitioning a first table into first partitions based on a first attribute and the number of partition groups desired, partitioning a second table into second partitions based on a second attribute and the number of partition groups desired, and distributing the first partitions and the second partitions to the partition groups as partitioned.

An embodiment apparatus for setting up a massively parallel processing system includes a processor and a database set up module that, when executed by the processor, is configured to assign a primary key to a first table in the database and a foreign key to a second table in the database, the foreign key of the second table identical to the primary key of the first table, to determine a number of partition groups desired for the database, to partition the first table into first partitions based on the primary key assigned and the number of partition groups desired, to partition the second table into second partitions based on the foreign key assigned and the number of partition groups desired, and to distribute the first partitions and the second partitions to the partition groups as partitioned.

An embodiment massively parallel processing database system includes at least one memory and a database stored on the at least one memory, the database including a first table and a second table, the first table and the second table having been formed by assigning a primary key to the first table in the database and a foreign key to the second table in the database, the foreign key of the second table identical to the primary key of the first table, by determining a number of partition groups desired for the database, by partitioning the first table into first partitions based on the primary key assigned and the number of partition groups desired, by partitioning the second table into second partitions based on the foreign key assigned and the number of partition groups desired, and by distributing the first partitions and the second partitions to the partition groups as partitioned.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely a massively parallel processing (MPP) database and management thereof. The concepts in the disclosure may also apply, however, to other types of databases and data management systems.

Figure 1:
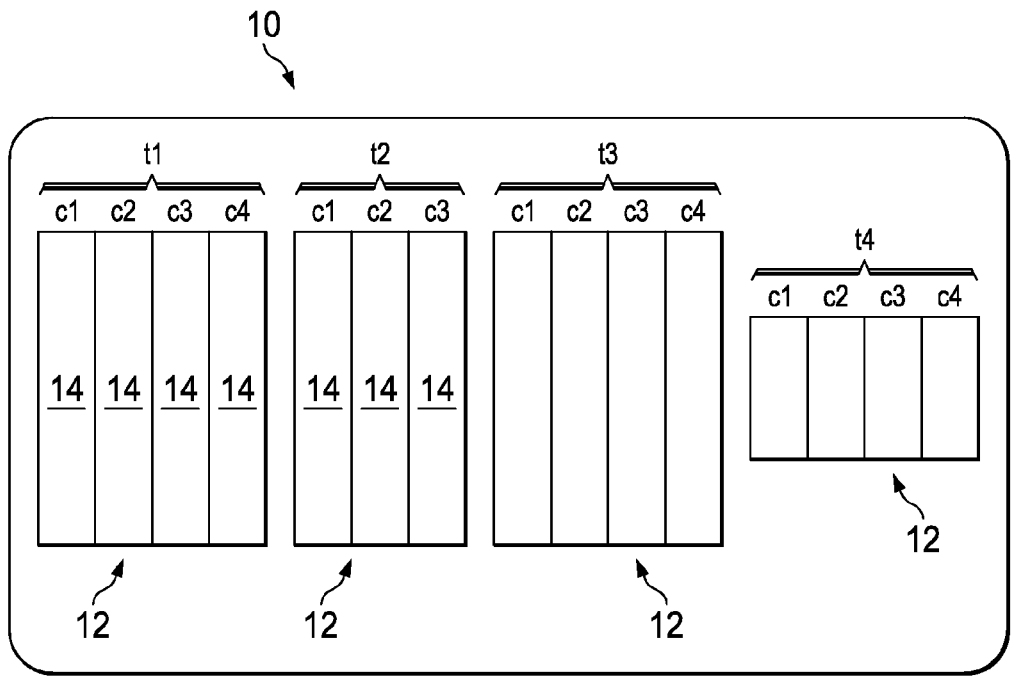
FIG. 1 illustrates a conventional database having non-partitioned tables (e.g., t1-t4)

Referring now to FIG. 1, and for the purpose of reference, a conventional or typical massively parallel processing (MPP) database 10 without partitioning is illustrated. As shown, the database 10 includes four tables 12 (e.g., t1-t4). Each of the tables 12 includes several columns 14 (e.g., c1, c2, c3, etc.). As they are filled with additional or new data, the tables 12 rapidly expand in size and can become too large for a single processor to efficiently handle. To improve efficiency, the larger tables 14 may be partitioned.

Figure 2:
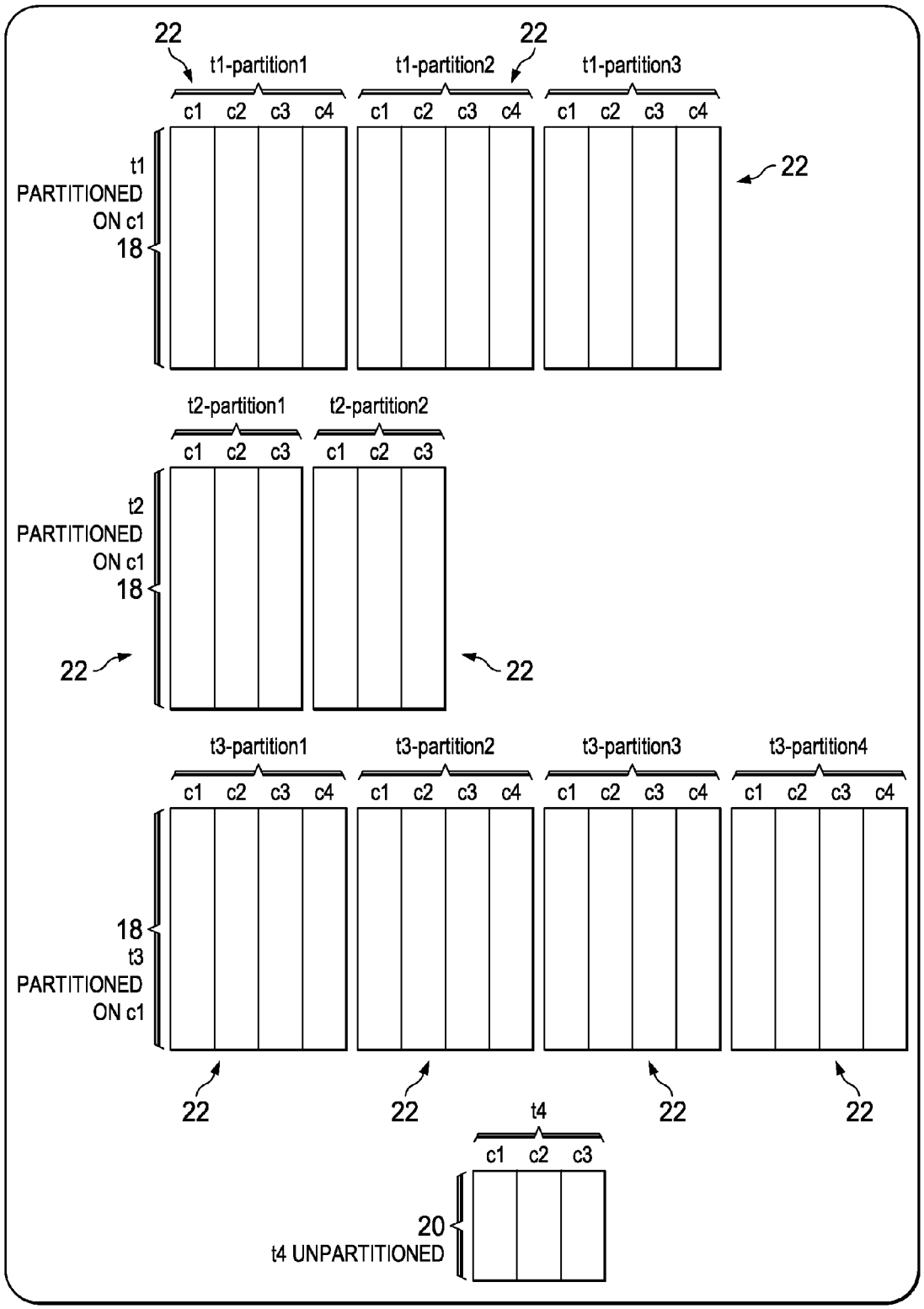
FIG. 2 illustrates a conventional database having both partitioned tables (e.g., t1-t3) and a non-partitioned table (e.g., t4)

Referring now to FIG. 2, and for the purpose of reference, a conventional or typical massively parallel processing (MPP) database 16 having both partitioned tables 18 (e.g., t1-t3) and a non-partitioned table 20 (e.g., t4) is illustrated. As shown, the partitioned tables 18 (e.g., t1-t3) have been divided into partitions 22 (e.g., t1-partition1, t1-partition2, t1-partition3, t2-partition2, etc.). One of the tables 20 (e.g., t4), which is likely relatively small compared to the others, remains unpartitioned. Unfortunately, each of the partitions 22 and the unpartitioned table 20 are assigned to a different processor and resident on a different memory or storage device. Therefore, any query of the database 16 likely uses join commands, calls for the use of several processors, and mandates accessing several unrelated memory or storage devices to retrieve the data in various partitions. Such a query process is inefficient.

Figure 3:
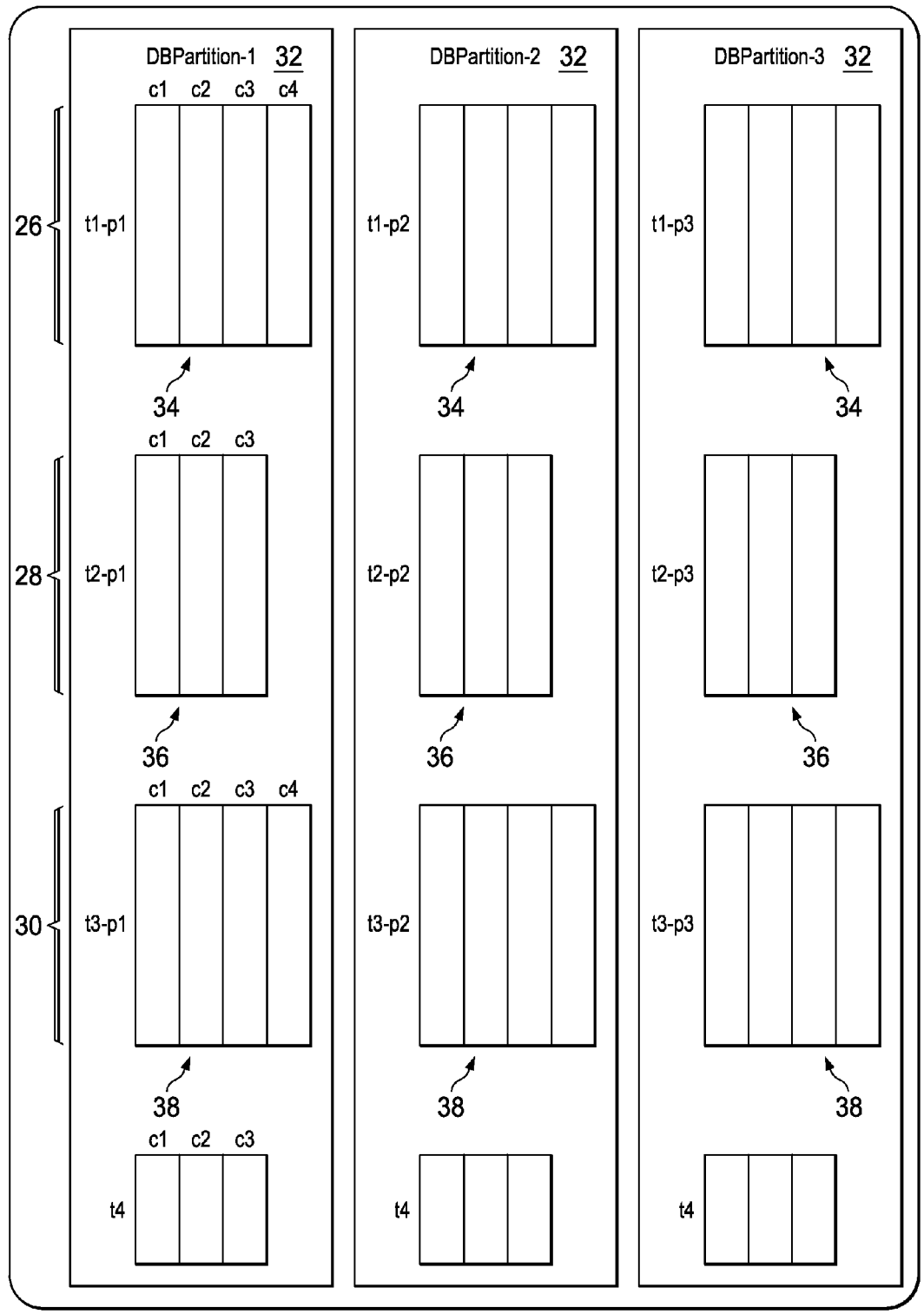
FIG. 3 illustrates an embodiment database having partition groups (e.g., DBPartition-1, DBPartition-2, DBPartition-3) containing various partitions (e.g., t1-p1, t1-p2, t1-p3, t2-p1, etc.) from partitioned tables (e.g., t1-t3) and a non-partitioned table (e.g., t4)

Referring now to FIG. 3, an embodiment massively parallel processing (MPP) database 24 is illustrated. The database 24 of FIG. 3 is created by assigning a primary key to a first table 26 (i.e., t1, before partitioning) and a foreign key to a second table 28 (i.e., t2, before partitioning). The foreign key of the second table 28 is identical to the primary key of the first table 26. As such, a relationship is established between the first and second tables. The primary/foreign keys may be assigned to each of the tables based on the type of data or values stored in each column (e.g., c1, c2, c3, etc.) of the tables.

Primary and foreign keys may also be assigned to a third table 30 (e.g., t3, before partitioning) or additional tables in the database 24. By way of example, the foreign key of the third table 30 is identical to either the primary key of the first table 26 or the primary key of the second table 28. As such, a relationship is established between the first and third tables or the second and third tables. This process of assigning keys to tables may be repeated in similar fashion for additional tables.

After the keys have been assigned, the number of partition groups 32 (e.g., DBPartitions, containers, etc.) is determined. By way of example, three of the partition groups 32 have been chosen in FIG. 3. It should be recognized that more or fewer partition groups 32 may be chosen based on, for example, the size of tables 26, 28, 30 in the database 24, available processors or storage, and so on. In an embodiment, each one of the partition groups 32 may function as its own independent database. In other words, the partition groups 32 perform as multiple smaller databases that can be cohesively and/or independently operated.

Still referring to FIG. 3, the first table 26 is partitioned or divided into first partitions 34 (i.e., t1-p1, t1-p2, t1-p3) based on the primary key assigned and the number of partition groups 32 selected. Similarly, the second table 28 is partitioned or divided into second partitions 36 (i.e., t2-p1, t2-p2, t2-p3) based on the foreign key assigned and the number of partition groups 32 selected Likewise, the third table 30 is partitioned or divided into third partitions 38 (i.e., t3-p1, t3-p2, t3-p3) based on the foreign key assigned and the number of partition groups 32 determined. Notably, the number of first partitions 34, second partitions 36, and third partitions 38 in FIG. 3 is the same. In other words, the first, second, and third tables 26, 28, 30 are equally divided based upon the number of partition groups 32 being used. If, for example, four of the partition groups 32 was being used, tables 26, 28, 30 would have been divided into fourths or four parts instead of thirds or three parts. In an embodiment, the partition groups 32 also include indexes, catalogs, permissions, and so on relating to the data in corresponding partition group 32.

After the tables 26, 28, 30 (i.e., t1-t3) are partitioned as noted above, the first, second, and third partitions 34, 36, 38 are distributed to the partition groups 32 as shown in FIG. 3. The fourth table 40 (i.e., t4) in FIG. 3, which is likely relatively small compared to the other tables (t1-t3), is unpartitioned and replicated in each of the partition groups 32.

Because the process of partitioning the tables 26, 28, 30 was done using the primary-foreign key relationships, the data in the partitions collected in each partition group 32 is likely related in some manner. In other words, each partition group 32 contains partitions holding data that is linked through some attribute. Therefore, when queries are performed, efficiency is improved. Indeed, the data corresponding to a particular query is now likely, or more likely, to be found in a single partition group 32. Therefore, the need to perform join commands, access partitions located in different places, and so on is mitigated or eliminated.

In an embodiment, after the partition groups 32 have been established, each of the partition groups 32 is assigned to an independent processor and/or an independent memory. As such, each partition group 32 is provided with its own resources.

Figure 4:
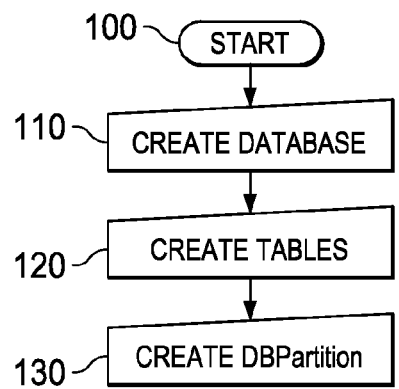
FIG. 4 is a high-level flow diagram illustrating creation of a database, tables, and partition groups of FIG. 3.

Referring now to FIG. 4, a high-level flow diagram illustrating creation of the database 24, tables 26, 28, 30, and partition groups 32 of FIG. 3 is provided. As shown, in block 100 the process starts. In block 110, the database 24 is created. Thereafter, in block 120, the tables 26, 28, 30 are created. In block 130, the partition groups 32 as shown, for example, in FIG. 3 are created.

Figure 5:
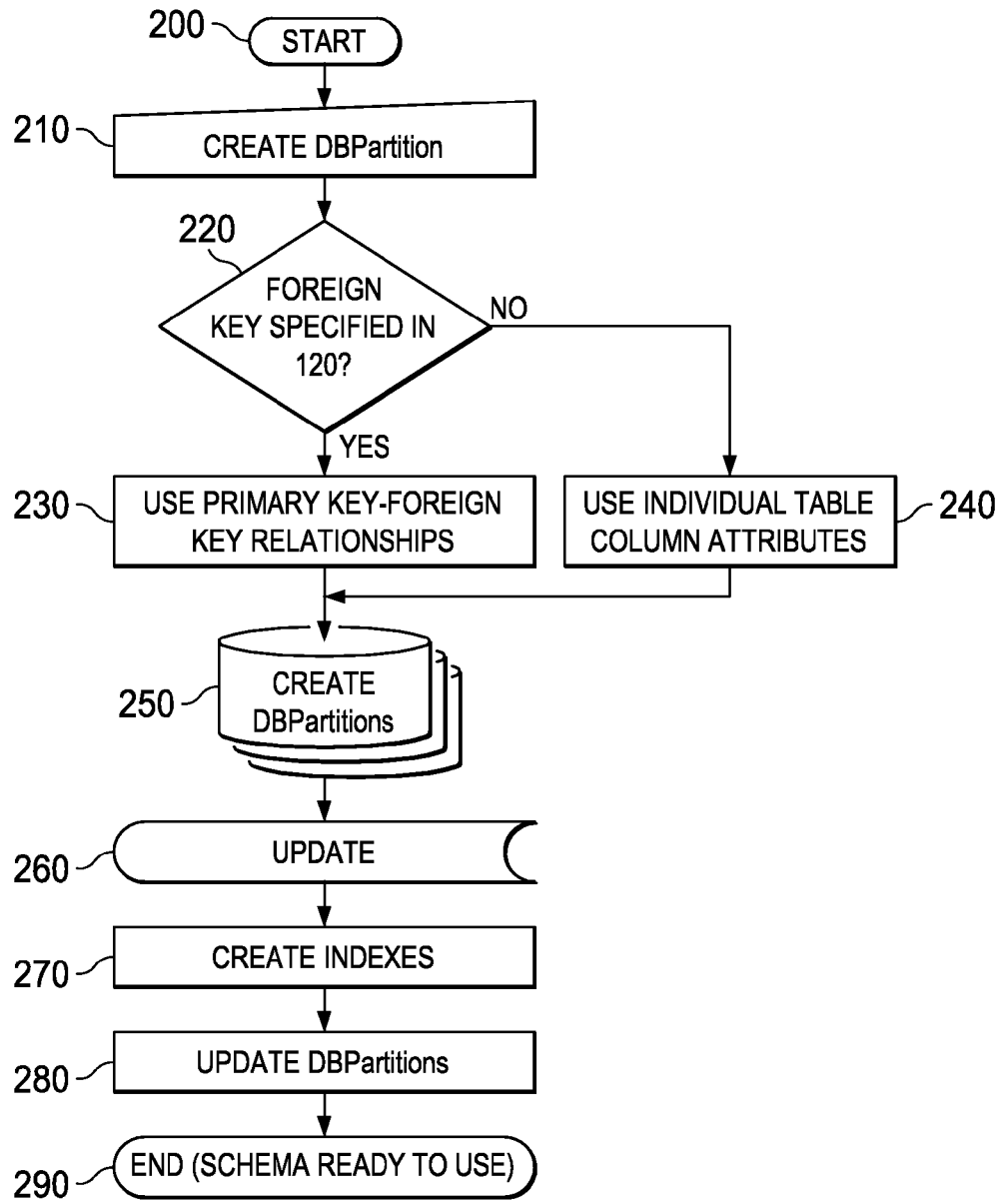
FIG. 5 is a flow diagram illustrating creation of the partition groups of FIG. 3.

Referring now to FIG. 5 a flow diagram illustrating creation of the partition groups 32 of FIG. 3 is provided. As shown, in block 200 the process starts. In block 210, the process of creating the partition groups 32 (a.k.a., DBPartitions) begins. In block 220, a determination of whether a foreign key has been specified is made. If a foreign key has not been specified, then in block 240 individual table column attributes are used. If, however, a foreign key has been specified, then in block 230 the primary key-foreign key relationships are used.

Still referring to FIG. 5, in block 250 the partition groups 32 are created and assigned to a processor and storage. Thereafter, in block 260 the catalog is updated with, for example, metadata, and so on. In block 270, indexes are created and in block 280 the partition groups 32 are updated by storing the index information. Then, in block 90 the partition group 32 process is ended and the schema is ready to use.

Figure 6:
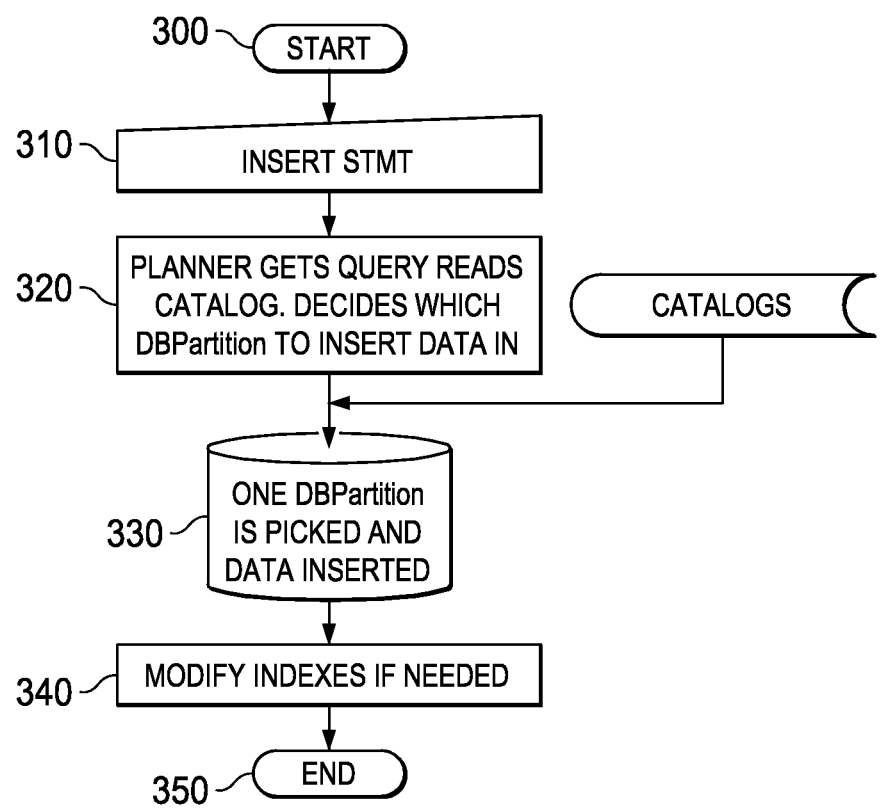
FIG. 6 is a flow diagram illustrating an insert operation used to populate the partition groups of FIG. 3.

Referring now to FIG. 6, a flow diagram illustrating an insert operation used to populate the partition groups 32 of FIG. 3 is provided. As shown, in block 300 the process starts. In block 310, an insert statement is received from the client. In block 320, the planner receives the query and reads the catalog(s) and decides which of the partition groups 32 to insert the data in. In block 330, one of the partition groups 32 is selected and the data is inserted into that partition group. In block 340, the indexes are modified (e.g., using the process in block 270 in FIG. 5), if needed. Thereafter, in block 350 the process ends.

Figure 7:
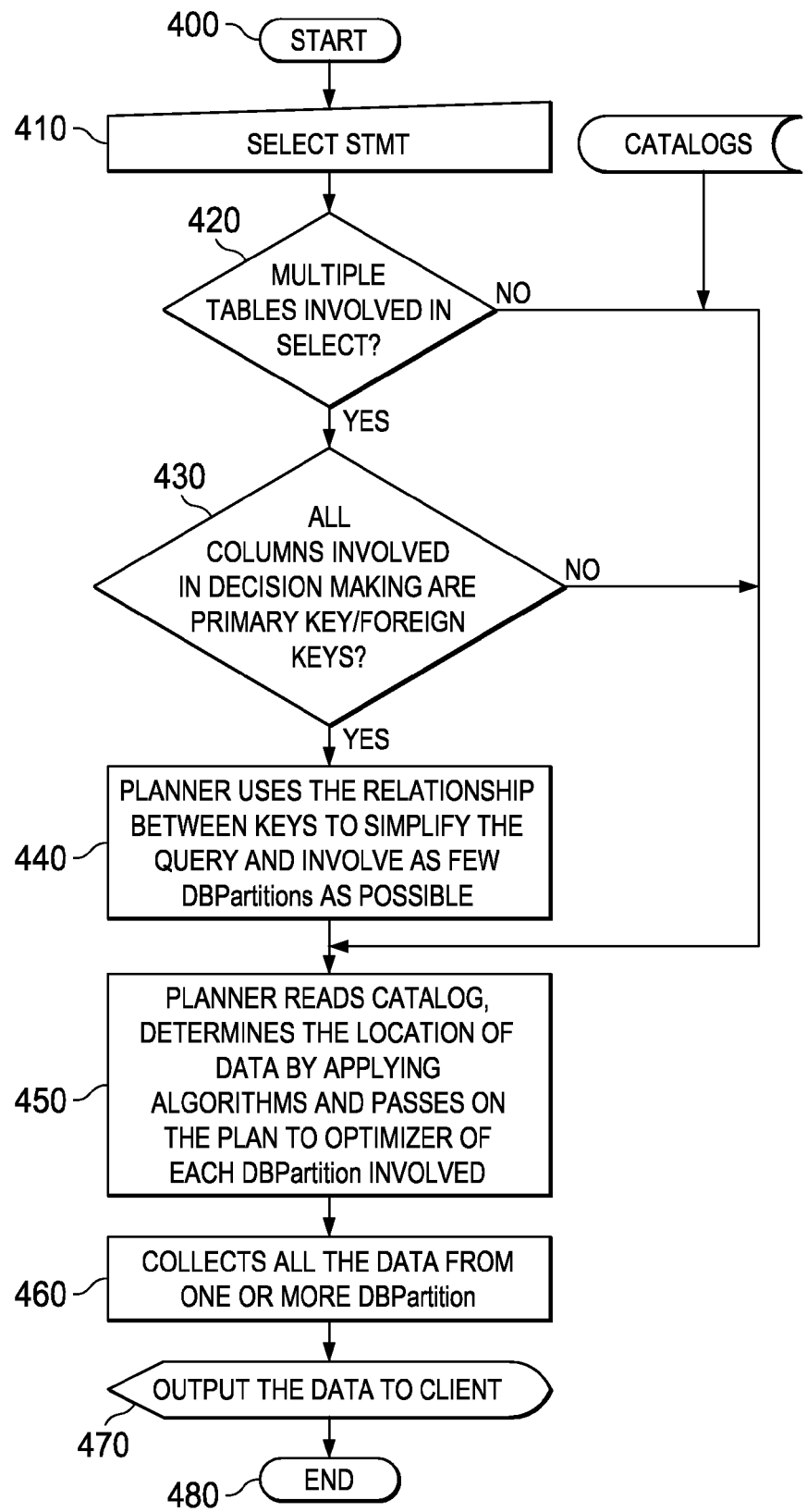
FIG. 7 is a flow diagram illustrating a process of retrieving data from the partition groups of FIG. 3.

Referring now to FIG. 7, a flow diagram illustrating a process of retrieving data from the partition groups 32 of FIG. 3 is provided. As shown, in block 400 the process starts. In block 410, a select statement is received from the client. In block 420, a determination of whether the select statement involves multiple tables. If the multiple tables are not involved, then the process proceeds to block 450, which will be described more fully below. If, however, multiple tables are involved, then in block 430 a determination of whether all columns involved in the decision making are primary or foreign keys. If all of the columns are not involved in the decision making are primary/foreign keys, then the process proceeds to block 450, which will be described more fully below.

Still referring to FIG. 7, in block 440 the planner uses the relationship between primary and foreign keys to simplify the query and involve as few partition groups 32 as possible. Because the partition groups 32 have been organized using the primary and foreign key relationships, the query should be handled more efficiently. Next, in block 450 the planner reads the catalog, determines the location of the data by applying algorithms, and passes on the plan to the optimizer of each of the partition groups 32 involved in the query. Then, in block 460, the data from the one or more partition groups 32 is collected. In block 470 the data is output to the client. Thereafter, in block 480 the process ends.

Figure 8:
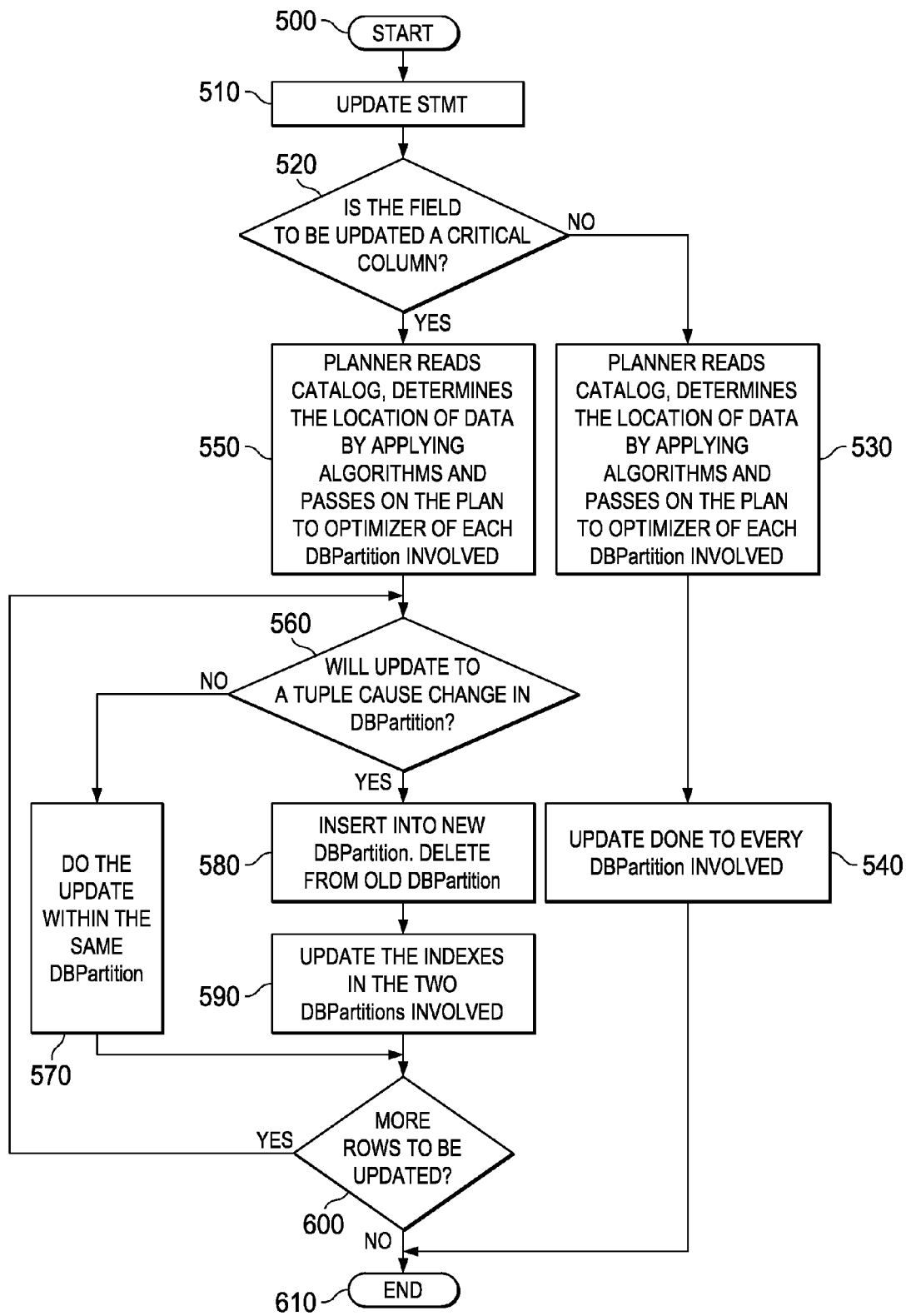
FIG. 8 is a flow diagram illustrating a process of updating data in the partition groups of FIG. 3.

Referring now to FIG. 8, a flow diagram illustrating a process of updating data in the partition groups of FIG. 3 is provided. As shown, in block 500 the process starts. In block 510, an update statement is received from the client. In block 520, a determination of whether the field to be updated is a critical column (i.e., serving as a primary or foreign key). If not, in block 530 the planner reads the catalog, determines the location of data by applying algorithms, and passes on the plan to the optimizer of each of the partition groups 32 involved in the query. Thereafter, in block 540, an update is done to every partition group 32 involved and the process ends in block 610.

Still referring to FIG. 8, if the determination in block 520 is that the field to be updated is a critical column, then in block 550 the planner reads the catalog, determines the location of the data by applying algorithms, and passes on the plan to the optimizer of each of the partition groups 32 involved in the query. In block 560, a determination of whether the update to a tuple (i.e., row) cause a change in the partition groups 32 is made. If not, then in block 570 the update is performed within the same partition group 32 and the process proceeds to block 600, which will be described more fully below.

If, however, the update will result in a change, then in block 580 the update is inserted into a new partition group 32 and the old update is deleted from the old partition group. In block 590, the indexes of the two partition groups (i.e., the new and the old) are updated. Then, in block 600, a determination of whether more rows are to be updated is made. If so, then the process reverts back to block 560. If not, then in block 610 the process ends.

Figure 9:
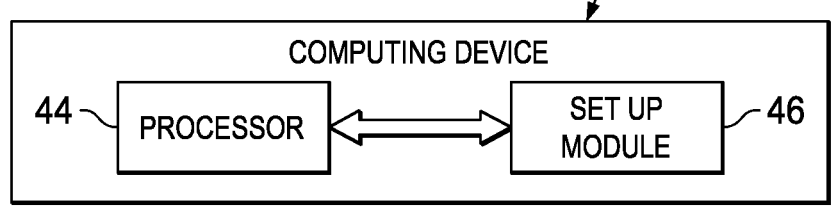
FIG. 9 is an apparatus for setting up a massively parallel processing system.

Referring now to FIG. 9, an apparatus 42 for setting up a massively parallel processing system is disclosed. In an embodiment, the apparatus 42 is a laptop computer, a notebook computer, a desktop computer, server, or other processing device. In an embodiment, the apparatus 42 includes a processor 44 in communication with a database set up module 46, which may be stored or resident in a memory (not shown). When the database set up module 46 is executed by the processor 44, the database set up module 46 is configured to set up or otherwise create the database 24 of FIG. 3 on a server(s), in the cloud, and so on.

In an embodiment, when the database set up module 46 is executed by the processor 44, the database set up module 46 assigns a primary key to a first table in the database and a foreign key to a second table in the database. Notably, the foreign key of the second table is identical to or matches the primary key of the first table. The database set up module 46 also determines a number of partition groups desired for the database, partitions the first table into first partitions based on the primary key assigned and the number of partition groups desired, partitions the second table into second partitions based on the foreign key assigned and the number of partition groups desired, and then distributes the first partitions and the second partitions to the partition groups as partitioned.

In an embodiment, the processor 44 is configured to assign at least one of an independent processor and an independent memory to each of the partition groups 32 and to replicate an unpartitioned table (e.g., t4) into in each of the partition groups 32.

Figure 10:
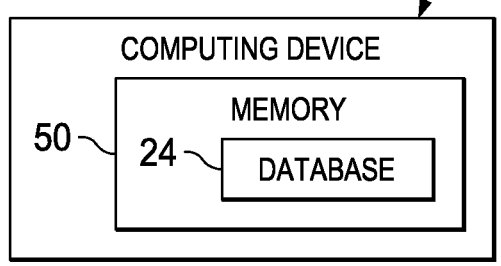
FIG. 10 is massively parallel processing database system.

Referring now to FIG. 10, a massively parallel processing database system 48 is illustrated. The massively parallel processing database system 48 is configured or adapted to implement or take advantage of the processes, methods, and actions disclosed herein. In an embodiment, the system 48 is a laptop computer, a notebook computer, a desktop computer, server, or other processing device. In an embodiment, the system 48 includes at least one memory 50 storing, for example, the database 24 of FIG. 3.

The database 24 of FIG. 10 includes a first table (e.g., t1 of FIG. 3) and a second table (e.g., t2 of FIG. 3). The first table and the second table have been formed by assigning a primary key to the first table in the database 24 and a foreign key to the second table in the database 24. The foreign key of the second table is identical to or matches the primary key of the first table. The first table and the second table have been also been formed by determining a number of partition groups desired for the database, by partitioning the first table into first partitions based on the primary key assigned and the number of partition groups desired, by partitioning the second table into second partitions based on the foreign key assigned and the number of partition groups desired, and by distributing the first partitions and the second partitions to the partition groups as partitioned.

It should be recognized that the present disclosure presents a method to distribute data in tables from an entire database point of view instated of from an individual table point of view. As such, more of the related data, which might belong to different tables, is co-located in the same partition group 32. As such, performance is improved during query execution. Indeed, the present disclosure presents processes that de-normalize the data at the time of storage and packs the related data together in partition groups 32 for faster access.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for logically dividing a database into multiple independently operated smaller databases, comprising:
   determining a number of partition groups desired for the database;
   partitioning a first table into a plurality of first partitions based on the determined number of partition groups desired, wherein the first partitions are less than or equal to the number of partition groups;
   partitioning a second table separate and at least partially different from the first table into a plurality of second partitions based on the number of partition groups desired, wherein the second partitions are less than or equal to the number of partition groups; and
   rearranging the first table and the second table into new tables corresponding to the partition groups by distributing the first partitions and the second partitions across the same partition groups, each one of the first partitions and each one of the second partitions moved into one of the partition groups forming a new table,
   wherein each one of the partition groups is an independently operated database comprising corresponding data, indexes, and internal catalogs allowing the each one of the partition groups to function as a database independently from the other partition groups.

2. The method of claim 1, further comprising assigning a processor to each of the partition groups.

3. The method of claim 1, further comprising assigning a storage to each of the partition groups.

4. The method of claim 1, further comprising replicating an unpartitioned table in each of the partition groups.

5. The method of claim 1, wherein a number of the first partitions in the first table is equal to a number of the second partitions in the second table.

6. The method of claim 1, further comprising assigning a third key to a third table in the database, and partitioning the third table in a same number of partitions as the first table.

7. An apparatus for setting up a massively parallel processing system, comprising:
   a processor; and
   a database set up module that, when executed by the processor, is configured to determine a number of partition groups desired for the database, to partition a first table into a plurality of first partitions based on the number of partition groups desired, to partition a second table separate and at least partially different from the first table into a plurality of second partitions based on the number of partition groups desired, and to rearrange the first table and the second table into new tables corresponding to the partition groups by distributing the first partitions and the second partitions across the same partition groups, each one of the first partitions and each one of the second partitions moved into one of the partition groups forming a new table, wherein each one of the partition groups is an independently operated database comprising corresponding data, indexes, and internal catalogs allowing the each one of the partition groups to function as a database independently from the other partition groups.

8. The apparatus of claim 7, wherein the processor is configured to assign at least one of an independent processor and an independent memory to each of the partition groups.

9. The apparatus of claim 7, wherein the processor is configured to replicate an unpartitioned table in each of the partition groups.

10. The apparatus of claim 7, wherein a number of the first partitions is equal to a number of the second partitions.

11. The method of claim 1, wherein the step of partitioning the first table into first partitions and the second table into second partitions comprises hashing a column in each of the first table and the second table.

12. The method of claim 1 further comprising assigning a primary key to a first table in the database and a foreign key to a second table in the database, the foreign key of the second table identical to the primary key of the first table, wherein the first table is partitioned into first partitions based on the primary key, and wherein the second table is partitioned into second partitions based on the foreign key.

13. The method of claim 1 wherein the first table is partitioned into first partitions based on a first attribute selected based on one of a plurality of columns in the first table, and wherein the second table is partitioned into second partitions based on a second attribute selected based on one of a plurality of columns in the second table.

14. The method of claim 1, wherein each one of the first partitions in the first table and the second partitions in the second table have a total number equal the number of partition groups desired.

15. The apparatus of claim 7, wherein the database set up module that, when executed by the processor, is configured to assign a primary key to a first table in the database and a foreign key to a second table in the database, the foreign key of the second table identical to the primary key of the first table, wherein the first table is partitioned into first partitions based on the primary key, and wherein the second table is partitioned into second partitions based on the foreign key.

16. The apparatus of claim 7, wherein the database set up module that, when executed by the processor, is configured to partition the first table into first partitions based on a first attribute selected based on one of a plurality of columns in the first table, and to partition the second table into second partitions based on a second attribute selected based on one of a plurality of columns in the second table.

17. The apparatus of claim 7, wherein each one of the first partitions in the first table and the second partitions in the second table have a total number equal the number of partition groups desired.

* * * * *